United States Patent [19]
Chattha et al.

[11] Patent Number: 4,808,441
[45] Date of Patent: Feb. 28, 1989

[54] METAL ARTICLES HAVING CORROSION-RESISTANT EPOXY COATINGS

[75] Inventors: Mohinder S. Chattha, Livonia; Harendra S. Gandhi, Farmington Hills, both of Mich.

[73] Assignee: Ford Motor Company, Dearborn, Mich.

[21] Appl. No.: 50,126

[22] Filed: May 15, 1987

[51] Int. Cl.⁴ .................. B05D 3/02; B32B 15/08; B32B 27/38; F01N 7/16
[52] U.S. Cl. .................. 427/386; 181/282; 181/245; 428/418; 528/99
[58] Field of Search ............. 427/386; 428/418; 181/245, 282; 528/99

[56] References Cited

U.S. PATENT DOCUMENTS

| | | | |
|---|---|---|---|
| 3,886,119 | 5/1975 | D'Alelio | 260/47 CP |
| 3,907,611 | 9/1975 | Sasame et al. | 148/6.3 |
| 4,042,426 | 8/1977 | Beiser | 428/667 |
| 4,074,010 | 2/1978 | Knight | 428/422 |
| 4,330,598 | 5/1982 | Lee et al. | 428/653 |
| 4,330,659 | 5/1982 | King et al. | 528/99 |
| 4,382,487 | 5/1983 | Baumann | 181/282 |
| 4,402,714 | 9/1983 | Fethke et al. | 55/35 |
| 4,416,920 | 11/1983 | Pierson et al. | 427/349 |
| 4,500,582 | 2/1985 | King et al. | 428/116 |
| 4,507,363 | 3/1985 | Chow et al. | 428/418 |
| 4,517,321 | 5/1985 | Gardner et al. | 523/400 |
| 4,579,885 | 4/1986 | Domeier et al. | 523/400 |
| 4,594,291 | 6/1986 | Bertram et al. | 428/414 |
| 4,608,404 | 8/1986 | Gardner et al. | 523/400 |

Primary Examiner—Michael Lusignan
Attorney, Agent, or Firm—Lorraine S. Melotik; Roger L. May

[57] ABSTRACT

This invention is directed to the use of particularly defined epoxy-amine compositions as a protective coating on metals which are exposed to a high temperature, corrosive environment. The metal may be that employed in motor vehicle exhaust system components, such as mufflers and tailpipes. The epoxy-amine compositions comprises epoxy resin component, aromatic amine component, optionally, acid component selected from polycarboxylic acid and anhydrides thereof and optionally, polyol component.

16 Claims, 2 Drawing Sheets

Surface Under The Epoxy-Amine Coated Side Of Aluminized Steel Panel After 15,000 Simulated Miles In Pulsator Test

METAL ARTICLES HAVING CORROSION-RESISTANT EPOXY COATINGS

TECHNICAL FIELD

This invention is directed to the use of epoxy-amine compositions as a protective coating on metals which are exposed to a high temperature, corrosive environment.

BACKGROUND OF THE INVENTION

Metal surfaces which are to be exposed to a corrosive environment are generally provided with a protective coating. The protective coating must be resistant to attack by the corrosive environment and must adhere well to the metal surface. If the corrosive environment is a high temperature corrosive environment, the protective coating must also be stable at the high temperature.

Automobile exhaust system components, e.g., a muffler, tailpipe or the like are subjected to a high temperature corrosive environment during operation of the automobile. This corrosive environment comprises acidic materials present in the exhaust gases which result from the operation of the catalytic converter which is part of the exhaust system. Automobiles employ a catalytic converter as part of the exhaust system to convert harmful substances produced by the internal combustion engine to harmless materials. One type of catalytic converter employed on automobiles comprises a honeycomb ceramic material coated in part with a catalyst capable of converting the substances which come in contact with it. In the catalytic converter, sulfur produced during burning of the fuel is converted to sulfur trioxide. The sulfur trioxide can adhere to the ceramic material and be retained for extended periods of time in the catalytic converter. This sulfur trioxide reacts with water vapor present in the exhaust system to form sulfuric acid, some of which may be carried out in the exhaust gases to deposit on the metal components of the exhaust system. Sulfuric acid itself if very corrosive to metal. Additionally, in rich burn (i.e., oxygen poor) engines, some of the nitrogen gas present in the intake air is converted in the catalytic converter to ammonia gas. The ammonia gas can combine with the sulfuric acid to form ammonium sulfate which can deposit on the components of the exhaust system. When the ammonium sulfate is exposed to water vapor which condenses on the exhaust system parts after engine shut down, a strongly acidic solution is formed which can cause substantial corrosive damage to the metal it contacts.

Certain high efficiency automobile engines produce relatively cool exhaust gases. This causes significant amounts of condensate to accumulate on exhaust system components like the muffler or tailpipes, especially during short trip, low speed driving. Since, in many cars, the muffler is placed relatively far away from the engine and catalytic converter, the muffler is the coolest component of the exhaust system. Thus the muffler provides surfaces on which the exhaust gases are most likely to condense, making the muffler particularly susceptible to corrosion.

In attempts to reduce the corrosive effects of exhaust gases on metal components of the system, various coatings have been suggested in patent literature. Pierson et al., in U.S. Pat. No. 4,416,920, teach that steel mufflers can be provided with an inexpensive, corrosion resistant coating of a lead-tin mixture. It is taught therein that the tin is necessary to alloy with the steel base and form a metallurgical bond between the coating and the steel base metal. In U.S. Pat. No. 4,330,598, Lee et al. teach providing a protective coating of zinc-aluminum to mild carbon steel surfaces, such as used in an automobile muffler, for improved resistance to corrosion and oxidation. Knight, in U.S. Pat. No. 4,074,010, teaches certain ceramic-paint coatings to be useful, for example, on mufflers to reduce corrosion thereof. Still further, in U.S. Pat. No. 4,042,426, Beiser teaches improving the corrosion resistance of a steel substrate, such as that used for manufacturing a muffler, by providing a corrosion resistant chromized coating thereon. Sasame et al., in U.S. Pat. No. 3,907,611, teach a method which comprises dipping a ferrous metal article, e.g., a muffler, in a molten metal bath containing aluminum or its alloy with chromium so as to improve the resistance of the ferrous metal to corrosion and oxidation. In still another attempt to reduce the corrosive effect of exhaust gases, mufflers have been fabricated of enamelled steel sheet metal as taught in U.S. Pat. No. 4,382,487 by Baumann. However, the fact that mufflers and tailpipes still need to be replaced on automobiles with great regularity attests to the fact that all of these proposed solutions have their deficiencies. Fethke et al., in U.S. Pat. No. 4,402,714, take yet another approach to solving the corrosion problem. They teach that corrosion of the metal parts of an automobile muffler can be significantly inhibited by placing an absorbent mass, preferably crystalline zeolitic molecular sieve, in the internal space thereof. The sieve is to be present in sufficient amounts to prevent condensation of water vapor from the engine exhaust gases on the walls of the muffler after engine shut down.

It is an object of the present invention to provide metal subtrates, such as those employed in an automotive exhaust system, with a coating which provides resistance to corrosion in a high temperature, corrosive environment. This object is realized by a method of the present invention which comprises providing a coating of a particular epoxy-amine composition on metal substrates, such as those employed in making articles for motor vehicle exhaust systems.

U.S. Pat. Nos. 4,517,321 and 4,608,404, to Gardner et al. and U.S. Pat. No. 4,579,885 to Domeier et al., which are commonly assigned, teach epoxy compositions comprising aromatic diamine hardeners, some of which are of the type which may be employed in the method of the present invention. The Gardner et al. compositions are taught to be useful to produce compositions which have improved tensile properties and high compressive strengths, i.e., when the compositions are combined with structural fibers. In the Domeier et al. patent, it is taught that the aromatic diamine hardeners must contain at least one alkyl substituent on an aromatic ring. It is further taught therein that a composition containing this specific type of diamine hardener, when used with epoxy compounds, exhibits reduced moisture absorption, improved solubility, and in certain cases, controlled reactivity which improves the processing characteristics of the composition. The compositions are taught to be useful with structural fibers to form composites. However, neither of these references teach employing the epoxy-amine compositions described therein as protective coatings for metal which is exposed to high temperature, corrosive environments.

BRIEF DESCRIPTION OF THE INVENTION

The invention is directed to the use of epoxy-amine compositions as a protective coating on a metal substrate exposed to a high temperature, corrosive environment. According to a first aspect of the invention, a method comprises applying a coating in a thickness of at least 0.5 mils of an epoxy-amine composition to a surface of a metal substrate, and subjecting the coated substrate to an elevated temperature sufficient to cure the composition to a cured coating. The epoxy-amine composition comprises: (A) epoxy resin component; (B) aromatic amine component: (C) optionally, acid component selected from polycarboxylic acid and anhydrides thereof; and (D) optionally, polyol component. The aromatic amine component (B) and the epoxy resin component (A) are employed in relative amounts which provide about 0.5 to about 1.5 reactive amine hydrogens per each epoxide group in the composition. Components (A), (B), (C) and (D) are employed in relative amounts which, in the cured coating, result in less than about 20 percent of moieties bridging carbon atoms being ester moieties, based on the total of all moieties bridging adjacent carbon atoms which are not direct covalent bonds. The epoxy resin component (a) is selected from epoxy resin (i) having a number average molecular weight between about 200 and 10,000, (ii) having at least two 1,2 epoxide groups per molecule, and (b) comprises aromatic polyepoxide resin, in sufficient portion that at least 50 percent of all carbon atoms in the epoxy resin component are aromatic carbon atoms. The aromatic amine component (a) is selected from aromatic amine having (i) a number average molecular weight between about 100 and about 10,000, (ii) at least one reactive amine group (per molecule) and at least two reactive amine hydrogens per molecule, and (iii) at least one phenyl ring per molecule, and (b) comprises at least about 90 weight percent aromatic polyamine. The aromatic polyamine has (i) at least two reactive amine groups per molecule and (ii) at least two phenyl rings per molecule wherein adjacent phenyl rings are bridged by moieties independently selected from a direct covalent bond, O, S, SO, $SO_2$, $PO_2$, CO, CONH, COO, and $CR_1R_2$, wherein $R_1$ and $R_2$ are independently hydrogen or alkyl or 1 to 4 carbon atoms. At least 80 percent of the reactive amine groups present in the aromatic amine component are directly attached to phenyl rings present in the aromatic amine component and at least 50 percent of all carbon atoms in the aromatic amine component are aromatic carbon atoms.

The present invention is also directed to an article comprising a metal substrate coated according to the method described above, wherein the article may be a motor vehicle exhaust system component exposed to a corrosive environment during operation of the motor vehicle.

Advantageously, the method of the present invention provides an article having a metal substrate coated with an epoxy-amine composition which is resistant to attack in a high temperature, corrosive environment. Exhaust components in a motor vehicle may be exposed to such environments during operation of the motor vehicle. The coating exhibits excellent adhesion to the metal substrate.

It has been found that metal substrates coated according to the method of the present invention and then exposed to aqueous ammonium sulfate at elevated temperatures for three months did not show any blistering, peeling or loss of adhesion of the coating to the metal substrate. An aged coating could not be peeled off even with adhesive tape. Thus the epoxy-amine coating has good adhesion to the metal substrate. In examining the metal substrate surface after the coating was removed. Scanning Electron Microscopy (SEM) analysis showed that there was no corrosion of the metal substrate.

The cured coating composition undergoes softening at elevated temperatures and upon further heating it transforms into a rubbery phase with a fairly high modulus. According to preferred embodiments, it continues to maintain this modulus to at least 250° C. and is stable in air up to about 400° C. Advantageously, it has thus been found that, even beyond the softening point and even when the coating composition is partially decomposed, the coating composition continues to provide an excellent barrier between the substrate and the corrosive species.

The coating composition of the method of the present invention also advantageously displays excellent shelf stability. It has been found that crosslinking of the uncatalyzed aromatic amine-epoxy composition takes place generally above about 100° C., more particularly above about 125° C., and that substantially no crosslinking takes place at room temperature.

DETAILED DESCRIPTION OF THE INVENTION

As described above, the present invention is directed to the use of epoxy-amine compositions as a protective coating on metals which are exposed to a high temperature, corrosive environment. The present invention is also directed to an article, particularly a motor vehicle exhaust component, comprising a metal substrate coated according to the method described above. The epoxy-amine composition comprises: (A) epoxy resin component, (B) aromatic amine component, (C) optionally, polycarboxylic acid component, and (D) optionally, polyol component. Details of the components of the epoxy-amine compositions employed as well as details of the steps of the method articles and components, of the present invention are hereinafter discussed in further detail.

The epoxy resin component employed in the coating composition in the method of this invention is selected from epxoy resins having (i) a number average molecular weight between about 200 and about 10,000, and (ii) at least two 1,2 epoxide groups per molecule the 1,2 epoxide group may be present as an internal epoxide group or a terminal epoxide group on the resin of the epoxy resin component. The epoxy resin component comprises aromatic polyepoxide resin. The epoxy resin component may include, in addition to the aromatic polyepoxide resin, aliphatic or cycloaliphatic polyepoxide resin. At least 50 percent of all carbon atoms in the epoxy resin component are aromatic carbon atoms, i.e., are part of a phenyl ring. Thus, at least 50 percent of all carbon atoms present in the aromatic polyepoxide resin and in any aliphatic polyepoxide resin in total, are aromatic carbon atoms. Use of an epoxy resin component having such a high percentage of aromatic carbon atoms, i.e., phenyl groups, contributes to the high temperature stability of the epoxy-amine coating composition. Use of the term "polyepoxide" herein refers to epoxy resins having more than one 1,2 epoxide group per molecule. The polyepoxide resin may contain three or more epoxide groups; particularly in view of availability and cost considerations, however, polyepoxide resins containing two epoxide groups appear to be preferable.

The aromatic polyepoxide resin used in the coating composition may be polyglycidyl ethers of polyhydric phenols, such as, for example, pyrocatechol, resorcinol, 4,4′-dihydroxydiphenyl methane, 4,4′-dihydroxy-3,3′-dimethyldiphenyl methane, 4,4′-dihydroxydiphenyl-dimethyl methane (bisphenol A), 4,4′-dihydroxydiphenyl methyl methane, 4,4′-dihydroxy-3′-dimethyldiphenyl propane, 4,4′-dihydroxy diphenyl, of 4,4′-dihydroxydiphenyl sulfone, tris-(4-hydroxy phenyl) methane, and the chlorination and bromination products of the aforementioned diols.

In particular, one class of suitable aromatic polyepoxide resins for the composition includes the reaction products of di- or polyhydric, mono-, di- or polycyclic compounds with epihalohydrins of the formula:

wherein X is halogen such as chloro and Y is hydrogen or lower alkyl such as methyl or ethyl. These epichlorohydrin reaction products are exemplified by such straight chain epoxy terminated compounds containing glycidyl ether groups as bis-phenol-A-epichlorohydrin reaction products that are commerically available as, for example, Epon 828, 836, 1001, 1004 (trademark, Shell Chemical Company) or Araldite 6010 and 8011 (trademark, Ciba-Geigy). Such products contain an average of at least about one, more preferably for this invention at least about two, aromatic groups i.e., phenyl groups for each epoxide group. Especially suitable are bisphenol-A-epichlorohydrin reaction products comprising in major amounts up to 10 or more bisphenol moieties within the epichlorohydrin reaction product backbone.

Other examples of epoxy compounds suitable for use as the aromatic polyepoxide resin of the coating composition include polyepoxide compounds (averaging more than about two epoxide groups per molecule) which are also commercially available. In this group of epoxy compounds are the Novolac epoxy resins available commercially as, e.g., D.E.N. 431, 438 and D.E.N. 485 (trademark, Dow Chemical Co.) and ECN, 235, ECN 1273 and ECN 1299 (trademark, Ciba-Geigy Co.). These epoxy resins include epoxidized products of phenol-formaldehyde resins and cresol-formaldehyde resins that contain terminal glycidyl ether groups from aromatic moieties.

Numerous aromatic polyepoxide resins, other than those described above, which are commercially available and which would be suitable in the method of the present invention would be apparent to those skilled in the art in view of the present disclosure. Exemplary of such polyepoxide resins are those taught in U.S. Pat. No. 4,579,885, which reference is specifically incorporated herein for its teachings of aromatic polyepoxide resins. As will be apparent to one skilled in the art from the present disclosure, mixtures of compatible aromatic polyepoxide resins may also be used as the aromatic polyepoxy resin of the composition.

The epoxy resin component may also comprise aliphatic or cycloaliphatic polyepoxide resins. The aliphatic polyepoxide resins may be a copolymer or acrylic acid ester of glycidol such as glycidyl acrylate and glycidyl methacrylate with one or more copylymerizable compounds. Cycloaliphatic epoxies may be prepared by expoxidation of dienes or polyenes as described in U.S. Pat. No. 4,517,321, which reference is hereby expressly incorporated by reference for such teachings.

The aromatic amine component employed in the epoxy-amine coating composition described herein is selected from aromatic amines having (i) a number average molecular weight between about 100 and about 10,000, (ii) at least one active amine group and at least two reactive amine hydrogens per molecule, and (iii) at least one phenyl ring per molecule. The aromatic amine component comprises at least about 90 weight percent aromatic polyamine. The aromatic polyamine has (i) at least two reactive amine groups per molecule and (ii) at least two phenyl rings per molecule, wherein adjacent phenyl rings are bridged by moieties independently selected from a direct covalent bond, O, S, SO, $SO_2$, $PO_2$, CO, CONH, COO, and $CR_1R_2$, wherein $R_1$ and $R_2$ are independently hydrogen or alkyl of 1 to 4 carbon atoms. Reactive amine hydrogens are defined herein as those amine hydrogens which react at commerically and economically attainable reaction conditions, i.e., generally the amine hydrogens of primary and secondary amine groups. The aromatic amine component may comprise amines having, e.g., one primary amine group, two secondary amine groups, or primary and secondary amine groups. In order to obtain good crosslink density in the cured coating, if the composition comprises diepoxides and the amine component has two secondary amine groups, it is preferred that some trifunctional amine (i.e., amine containing three amine groups per molecule) be included in the composition. If, on the other hand, the aromatic amine component comprises amines having only two reactive amine hydrogens per molecule, it is preferable that the epoxy resin component comprise some trifunctional epoxy resin, i.e., epoxy resin having three epoxide groups per molecule. The amines employed may also be substituted with functionality such as hydroxyl or carboxyl.

At least 80 percent of the total of all the reactive amine groups present in the aromatic amine component are directly attached to the phenyl rings present in the aromatic amine component. Such amines, having groups attached to the phenyl ring, contribute to the cured coating composition having good physical properties, e.g., good thermal stability and resistance to degradation by moisture. In addition, at least 50 percent of all carbon atoms present in the aromatic amine component are aromatic carbon atoms. Exemplary of aromatic diamines which may be employed in the aromatic amine component of the composition are 4,4'-diaminodiphenyl ether, 4,4'-diaminodiphenyl methane, 4,4'-diaminodiphenyl sulfone, 3,3'-diaminodiphenyl sulfone, m-phenylenediamine, p-phenylenediamine, 4,4'-diaminodiphenylpropane, tris(4-aminophenyl) phosphine oxide, 4,4'-diaminodiphenyl sulfoxide, 4,4'-diaminodphenyl sulfide, 1,4'-bis(p-aminophenoxy)benzene, 1,4'-bis(m-aminophenoxy)benzene, 1,3-bis-(m-aminophenoxy)benzene, 4-aminophenyl-4'-aminobenzamide, 4-amino phenyl-4'-amino benzoate, 4,4'-diaminobenzophenone, and 1,3-bis(p-aminophenoxy)-benzene. Still other aromatic polyamines which may be employed are the diamines and substituted diamine taugth in U.S. Pat. Nos. 4,517,321 and 4,579,885, respectively as will the aromatic diamines described in U.S. Pat. No. 3,886,119. Exemplary of suitable aromatic polyamines having more than two amine groups per molecule are triamino-pyrimidine, tris-(4-aminophenyl) phosphine, oxide, and 3,4,4'-triamodiphenyl sulfone. As would be apparent to one skilled in the art in view of the present disclosure, mixtures of suitable aromatic polyamines may also be employed as the aromatic amine component in the coating compositions employed in this invention.

The aromatic amine component may also comprise amines such as those having one phenyl ring and one primary amine group, e.g., aniline or one phenyl ring and two secondary amine groups, e.g., as 1,4-(methylamino) phenylene. Such amines, having only one phenyl ring, may be present in the composition in amounts less than about 10 percent by weight based on the weight of the aromatic amine component.

The aromatic amine component and the epoxy resin component are employed in the epoxy-amine composition in amounts which provide about 0.5 to about 1.5 reactive amine hydrogens per each epoxide group in the epoxy-amine composition.

The composition may optionally include acid component selected from polycarboxylic acids and anhydrides thereof and, optionally, polyols. Preferably the polycarboxylic acid is a dicarboxylic acid and the polyphenol is a diphenol. Such materials aid in chain extending the epoxy resins to produce higher molecular weight epoxy resins in situ. Additionally, in some instances, the physical properties of the coating composition, e.g., flexibility, can be enhanced by use of the optional polycarboxylic acids and polyols, as will be apparent to one skilled in the art in view of the present disclosure. The epoxy resin component, the aromatic amine component, the (optional) polycarboxylic acid component and the (optional) polyol component are employed in the composition in relative amounts which, in the cured coating, result in less than about 20 percent of the moieties bridging adjacent carbon atoms being ester moieties based on the total of all moieties bridging adjacent carbon atoms which are not direct covalent carbon-carbon bonds. Such ester moieties in a reaction product include those initially present in the components (e.g., in the epoxy resin) and those formed by reaction of the components (e.g., by reaction of an epoxide group of the epoxy resin and a carboxyl group of polycarboxylic acid). Preferably, all components employed in the composition are substantially saturated components, i.e., they contain substantially no ethylenic double bonds.

Exemplary polycarboxylic acids suitable to be included in the composition include aliphatic, aromatic, cycloaliphatic polycarbylic acids and anhydrides thereof. Preferred are $C_6$–$C_{12}$ dicarboxylic acids such as adipic, azelaic, sebasic, phthalic, isophthalic acid and dodecane or cyclohexane dicarboxylic acid. Mixtures of suitable acids or anhydrides may also be employed in the composition.

Exemplary polyols suitable to be included in the composition include triols such as 1,2,6-hexane triol, 1,1,1-trimethylol propane and polycaprolactone triols, as well as various known tetrols. However, diols, including alkylene glycols, such as butylene glycol, neopentylglycol and other glycols such as hydrogenated bisphenol A, caprolactone diols, polyether glycols, polyester diols, and polyether diols are preferred aliphatic polyols. Preferably, if polyols are employed in the epoxy-amine composition they are aromatic polyols, i.e., they are polyphenols. Exemplary of polyphenols which may be employed are resorcinol, catechol, hydroquinone, bisphenol A the like, as well as suitable mixtures thereof. Mixtures of suitable aliphatic and aromatic polyols (i.e. polyphenols) may also be employed in the composition.

Other materials which may optionally be employed in the coating composition are catalysts which increase the rate of cure, surface modifiers, solvents and pigments. Such catalysts, which may be used, include, but are not limited to, p-toluene solfonic acid, salts of trifluoro methane solfonate acid, and organo-phosphonium halides. Preferably, however, catalysts are not employed in the composition since they can adversely affect the properties of the cured coating. Generally, the amine moieties present in the composition are sufficient to accelerate curing of the composition.

In formulating the composition, the epoxy resin component and aromatic amine component and optional components are mixed according to conventional techniques for making such compositions, generally in a solvent such as toluene, xylene, methylethyl ketone, tetrahydrofuran, ethylacetate, dimethyladipate, dimethylformamide or compatible mixtures thereof. The solvent is preferably employed to facilitate the mixing of the components and to allow for convenient application of the coating composition. However, use of a solvent would depend on the particular components of composition. Embodiments of the composition may be formulated without solvent. The composition may optionally be heated to a temperature which causes a limited reaction of the components to take place, i.e., so as to increase the viscosity of the composition to a viscosity which facilitates application of a uniform coating on the substrate. As is known in the art, if low molecular weight components are employed, such limited pre-curing reaction is preferred. Generally, it is carried out at a temperature of about 100° and 150° C. The solids content of the coating composition is such that it allows for convenient application by a desired coating technique.

According to the method of this invention, a coating of the epoxy-amine composition prepared as described above is applied to surface of a metal substrate which is exposed to a high temperature, corrosive environment, as in an automobile exhaust system. The metal substrate may be any metal which is subject to corrosion when exposed to a high temperature, corrosive environment, and includes metals such as uncoated steel, galvanized steel, aluminized steel, tinplated steel, aluminum, tin, zinc and copper. It is preferable to clean the surface of the metal substrate, prior to coating, with a solvent such as xylene or acetone, which solvent may also be a solvent used in the coating composition. The coating is applied to the surface, generally by spraying, dipping, flow coating, or roller coating. Subsequently, the coated article is subjected to an elevated temperature sufficient to cure the composition to a cured coating. The composition is applied to the substrate in a thickness of at least about 0.5 mils, generally of between about 1.5 and 10 mils, so that, preferably, the cured coating thickness is between about 2 and 5 mils. Generally, the composition is cured at a temperature between about 150° C. and about 200° C., for between about 1 and about 2 hours. As will be apparent to those skilled in the art, cure conditions are dependent on the particular coating composition components, including types of amines, use of accelerators, etc. Selection of optional coating composition as well as coating and cure condition will be within the skill of those in the art in view of the present disclosure. The coated article may then be placed in a system in which, during use, it is exposed to a high temperature, corrosive environment. Good corrosion protection is afforded by the epoxy-amine coatings.

It may be desirable in some cases to provide the metal substrate with a primer coating, i.e., a coating applied between the metal substrate and the epoxy-amine composition described herein, to improve the adhesion therebetween. While such primer coating may be employed, it has not been found necessary according to the method of this invention since the epoxy-amine compositions have shown excellent adhesion to metal substrates in corrosive environments.

While the discussion above has focused on the advantages of using the epoxy-amine compositions as a coating, for example, for automobile exhaust system components such as mufflers or tailpipes, such discussion is not meant to limit the type of article having a metal substrate coated according to the method of this invention or to limit the system in which such coated article may be employed. Other articles in which such a coated metal substrate may be employed include, but are not limited to, chemical containers and pipes for transporting corrosive materials and in reactor systems.

The invention will be further understood by referring to the following detailed examples. It should be understood that the specific examples are presented by way of illustration and not by way of limitation. The use of the word "part" is hereafter intended to mean parts by weight.

EXAMPLE 1

Fifteen parts of polyepoxide resin XU252 (Ciba-Geigy Corp.) are added to a solution of 4.8 parts of 4,4'-diaminodiphenyl sulfone in 10 parts of acetone and 10 parts of dimethylacetamide solvent. The mixture is stirred at room temperature to obtain a homogeneous solution. The solution is further diluted with five parts of 2-propanol. Five panels of aluminized low carbon steel (1 cm$^2$ each) are washed with acetone and then with xylene. The panels are coated on one side by drawing the coating composition on them. The panels are dried in air at room temperature for five minutes, heated in an oven at 100° C. for half an hour and 180° C. for one hour. The final bake is at 200° C. for one hour.

Figure 1:
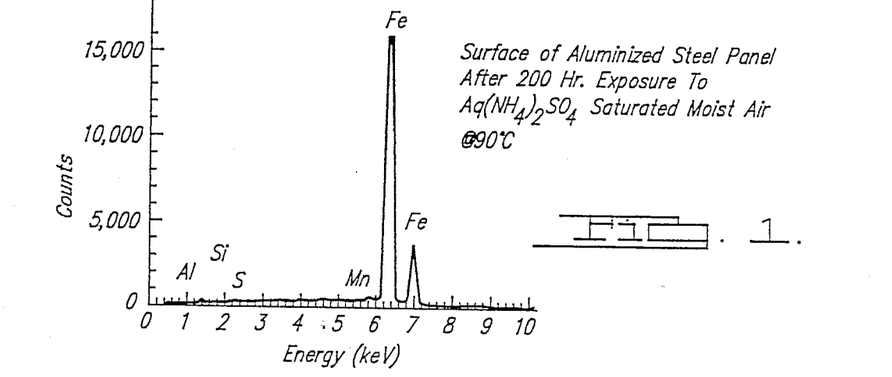
FIG. 1 is a Scanning Electron Microscopy (SEM) analysis of the surface of an aluminized steel panel after 200 hours exposure to ammonium sulfate saturated moist air at 90° C.
Figure 2:
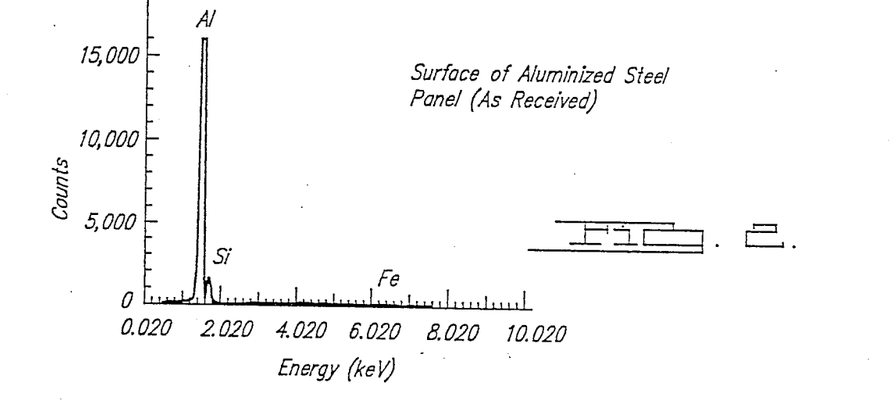
FIG. 2 is a SEM analysis of the surface of as received (from the supplier) aluminized steel.

The panels (one coated as described above and one uncoated) are placed in a pyrex glass tube of 1.5 cm diameter and 33 cm length. The tube is attached to a one liter round bottom flask in which a solution of 100 g of ammonium sulfate in 400 ml distilled water has been placed. Air is passed, 38 cc/min., through a sintered disc spurger immersed in the above solution and then through the attached tube. The flask and the tube are heated at 90° C. The air flow is continued and the exhaust is vented through a laboratory hood. The volume and the concentration of the ammonium sulfate solution are maintained nearly constant throughout the test. After 200 hours, the uncoated panel is removed, washed with distilled water and is examined with Scanning Electron Microscopy (SEM). A comparison with a Scanning Electron Micrograph (FIGS. 1 and 2) of aluminized low carbon steel, as received from the supplier, shows that in 200 hours all the aluminum of the uncoated surface is gone and the SEM sees only iron.

Figure 3:
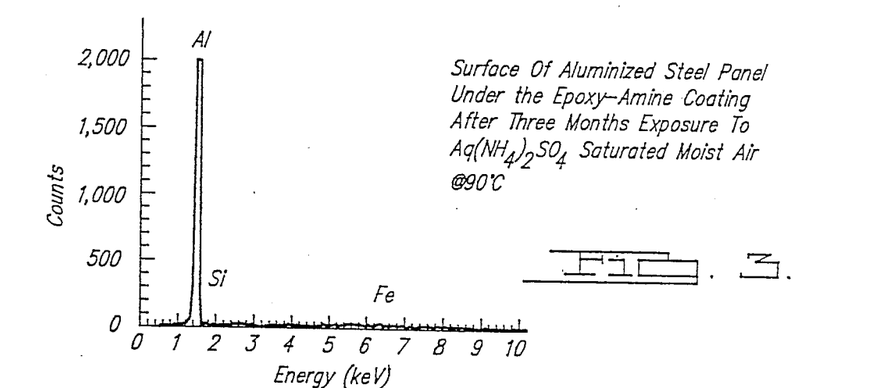
FIG. 3 is a SEM analysis of the surface of an aluminized steel panel under an epoxy-amine coating after three months exposure to ammonium sulfate saturated moist air at 90° C.

The ammonium sulfate aerosol treatment of the coated panel is continued for three months. The panel is then cooled to room temperature and washed with distilled water. The panel is then further cooled with liquid nitrogen. Adhesive tape is used in an attempt to remove the coating from the panel. The coating does not peel off. The coating is then removed with a razor blade and the surface is analyzed with SEM which shows that the aluminum layer is intact and no steel surface is exposed (FIG. 3).

EXAMPLE 2

Coated test panels are prepared as described in Example 1. The panels are tested in a Pulsator Reactor, which is described in detail by K. Otto, R. A. Della Betta and H. C. Yao in *Journal of the Air Pollution Control Association*, Vol. 24, No. 6, pg 596, June 1974. Two panels, each coated on one side, are placed downstream of the Three Way Catalyst (TWC) in the exhaust of the pulsator tube where 212° C. temperature is maintained. The pulsator cycle used during the simulated mileage accumulation includes cycling at temperatures 340°, 515°, and 730° C. for 17, 77 and 6% of the time, respectively, with pulsator modulation of +1 A/F at 0.5 Hz frequency. In this test procedure, the simulated mileages are 30 mph or 5000 miles per week at a nominal space velocity of 40,000 h$^{-1}$.

The fuel used in the simulated test consists of isooctane doped with a 0.2 mg phosphorus/liter, 1.5 mg lead/liter and 0.03 wt % sulfur. The fuel phosphorus is derived from cresyl diphenyl phosphate, sulfur from diethyl sulfide and the source of lead is "TELMOTOR MIX" containing tetraethyl lead, ethylene dichloride and ethylene dibromide in an atomic ratio of Pb:Cl:Br=1:2:1. The doped isooctate fuel is injected with a nebulizer directly into the hot portion of the pulsator furnace for cumbustion.

Figure 4:
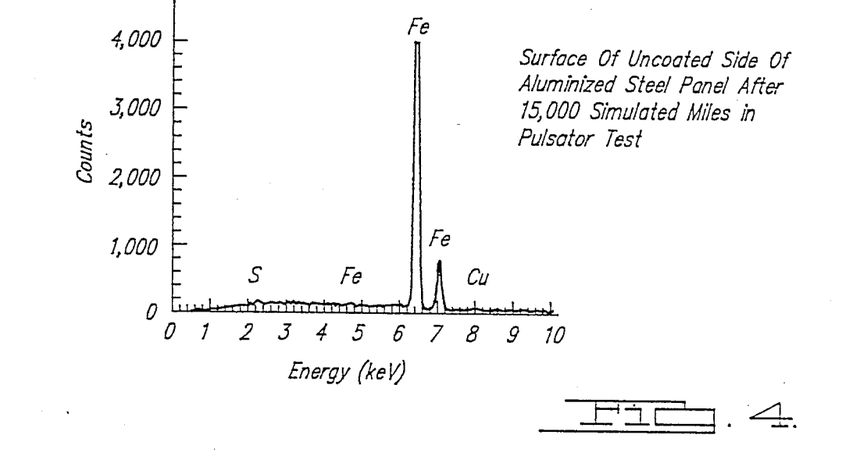
FIG. 4 is a SEM analysis of the surface of an aluminized steel panel under an epoxy-amine coating after 15,000 simulated miles in a pulsator test.
Figure 5:
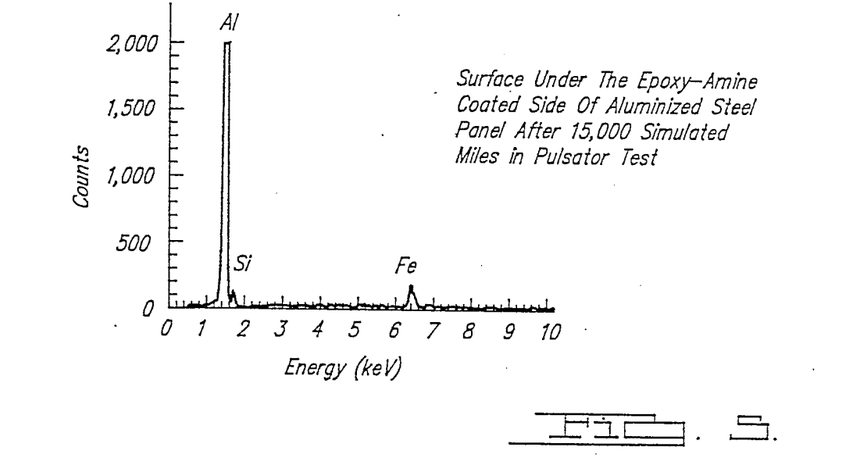
FIG. 5 is a SEM analysis of the uncoated surface of an aluminized steel panel after 15,000 simulated miles in a pulsator test.

The panels are aged in the pulsator with simulated exhaust for three weeks (15,000 simulated miles). One panel is washed with distilled water to remove the deposits. The panel is then cooled in liquid nitrogen and the coating is removed with a razor blade. The newly exposed surface and the uncoated opposite surface of the panel, not previously coated with an epoxy-amine composition, are examined by SEM (FIGS. 4 and 5, respectively). The comparison between FIGS. 4 and 5 shows that the uncoated surface has lost all of the aluminum layer due to corrosion, but the coated surface is fully intact.

EXAMPLE 3

The coating composition is formulated as described in Example 1. Two aluminized low carbon steel panels, 9 cm$^2$ each, are washed with acetone and xylene. The panels are coated on one side by drawing the coating composition and the panels are baked as described. in Example 1. The panels are placed in a 5% aqueous solution of sulfuric acid in a beaker for two weeks. The panels are then washed with distilled water and dried. The coated and uncoated surfaces are analyzed with SEM as described in Example 1. The uncoated surface has been stripped of all aluminum and the coated surface retains the aluminum coating and no corrosion is observed.

EXAMPLE 4

Eleven parts of polyepoxide resin XU252 (Ciba-Geigy Corp.) and four parts of diglycidyl bisphenol A (Epon 828, Shell Chem. Co.) are added to a solution of 4.7 parts of 4,4'-diaminodiphenyl sulfone in 11 parts of acetone and 10 parts of dimethyl acetamide. The coating is applied and tested as described in Example 1. The coated surface has shown excellent resistance to corrosion.

EXAMPLE 5

Composition described in Example 1 is prepared by employing 4.3 parts of 4,4'-diaminodiphenyl ether instead of the sulfone curing agent used therein. The aluminized panels are prepared and coated as described in Example 1 and tested in dilute sulfuric acid as described in Example 3. The coated surface shows excellent aluminum retention while the uncoated surface loses all aluminum and starts rusting.

EXAMPLE 6

A low carbon steel panel (9 $cm^2$) is washed with acetone and the composition described in Example 1 is applied to it on both sides. The panel is dried and baked according to the procedure of Example 1. The edges of the coated panel and of an uncoated panel are taped with adhesive tape and each is placed in a separate beaker containing 5% aqueous sulfuric acid at room temperature. After 10 days the panels are removed and the sulfuric acid solution is evaporated to dryness. The beaker containing the coated panel has no solid residue while the beaker containing the uncoated panel contains large amounts of iron sulfate.

EXAMPLE 7

The coating composition described in Example 1 is applied to a galvanized steel panel (9 $cm^2$) on one side. The panel is baked as described in Example 1. Edges of the panel are taped with adhesive tape and it is placed in 5% aqueous sulfuric acid at room temperature. After 16 days both sides of the panel are analyzed with SEM. The uncoated side has lost all of the zinc layer while the coated side shows no exposed iron surface.

EXAMPLE 8

Two pieces of copper foil are washed with acetone and xylene and one of them is coated with the composition described in Example 1 and baked as described therein. The foils are taped at the edges and they are placed in 5% aqueous sulfuric acid in two beakers at room temperature. After two days the acid solution containing the uncoated foil turned dark blue while the one containing the coated piece shows only a light blue color. After two weeks exposure, the uncoated foil shows perforation while the coated foil shows no observable loss of copper from the surface. The blue color in the case of coated foil is probably from the reaction of the acid on copper at the edges which are hard to coat. The tape can not prevent acid diffusion.

EXAMPLE 9

A coating composition is prepared by employing 4.1 parts of 4,4'-diaminodiphenyl sulfide as described in Example 1 instead of the sulfone used therein. The coating is applied to aluminized low carbon steel panels and they tested as described in Example 1. The uncoated panel shows severe loss of aluminum while the coated panel retains the aluminum layer intact.

EXAMPLE 10

Twelve parts of epoxy resin XU252 (Ciba-Geigy Corp.) and four parts of Epon 1001 (Shell Chemical Co.) are added to a solution of 4.6 parts of 3,3'-diaminodiphenyl sulfone in 10 parts of acetone and 10 parts of dimethylformamide. The mixture is strirred at room temperature to obtain a homogeneous solution. The solution is diluted with 12 parts of methyl amyl ketone and three parts of 2-propanol. Aluminized low carbon steel panels are coated and tested as described in Example 1. The coating composition displays excellent corrosion protection.

EXAMPLE 11

Ten parts of novolac epoxy resin D.E.N. 485 (Dow Chemical Co.) and 5 parts of Epon 828 (Shell Chemical Co.) are added to a solution of four parts of 4,4-diaminodiphenyl sulfone and half a part of 1,4-phenylene diamine in 10 parts of acetone and 11 parts of dimethylacetamide. The mixture is stirred to obtain a homogeneous solution and is diluted with eight parts of 2-propanol. Aluminized low-carbon steel panels are coated and tested as described in Example 1. The coated panel displays excellent aluminum retention while the uncoated surface shows total loss of aluminum.

EXAMPLE 12

Six parts of cresol-formaldehyde novolac epoxy resin ECN 1273 (Ciba-Geigy Corp.) and two parts of Epon 828 (Shell Chemical Co.) are added to solution of two parts of 3,3'-diaminodiphenyl sulfone and one part of tris (4-aminophenyl) phosphine oxide is five parts of acetone, seven parts of dimethyl formamide and six parts of 2-propanol. The mixture is stirred at room temperature to obtain a homogeneous solution. Aluminized low carbon steel panels are coated and tested as described in Example 3. This coating composition affords desirable corrosion protection.

EXAMPLE 13

A millbase is prepared by employing 40 parts of barium sulfate, 10 parts Epon 828 (trademark, Shell Chemical Co.) and 11 parts of xylene. Six parts of this millbase are included in the composition of Example 11. The resulting composition is applied to aluminized low carbon steel panels and they are tested as described in Example 3. The coated surface composition is found to be unaffected while the uncoated surface corrodes badly.

EXAMPLE 14

Ten parts of Epon 828 (Shell Chemical Co.), one part of 1,4-phenylene diamine and five parts of Udel Polysulfone P-1800 (trademark, Union Carbide Corp.) are dissolved in 10 parts of dimethyl-formamide and five parts of acetone and eight parts of methyl amyl ketone. The resulting formulation is applied to aluminized low carbon steel and tested in dilute sulfuric acid as described in Example 3. The SEM analysis shows that the coating provides excellent corrosion protection.

EXAMPLE 15

One part of phthalic anhydride and one and one half part of bisphenol A are mixed with 15 parts of epoxy resin XU252 (Ciba-Geigy Corp.) The above mixture is dissolved in 11 parts of acetone and the resulting solution is added to a solution of 4.5 parts of 4,4'-diaminodiphenyl sulfone in 10 parts of dimethyl acetamide and five parts of methyl amyl ketone. The composition is applied to aluminized low carbon steel panels and is tested as described in Example 1. The coated surface displays excellent corrosion resistance.

EXAMPLE 16

Ten parts of novolac epoxy resin D.E.N. 485 (Dow Chemical Co.) and two parts of bisphenol A are added to a solution of 2.5 parts of 4,4'-diaminophenyl sulfone in 10 parts of acetone, 10 parts of dimethylacetamide and six parts of 2-propanol. The composition is stirred at 40° C. for half an hour. Two aluminized low carbon steel panels, 9 cm² each, are washed with acetone and xylene. The panels are coated on one side by drawing the coating composition on them. The panels are then baked as described in Example 1. The panels are placed in 5% aqueous solution of sulfuric acid in a beaker for two weeks. The panels are then washed with distilled water and dried. The coated and uncoated surfaces are analyzed with SEM as described in Example 1. The uncoated surface has lost all aluminum and the coated surface retains the aluminum coating and no corrosion is observed.

In view of this disclosure, many modifications of this invention will be apparent to those skilled in the art. It is intended that all such modifications which fall within the true scope of this invention be included within the terms of the appended claims.

We claim:

1. A method of providing a corrosion protective coating on a motor vehicle exhaust system component comprising a metal substrate, which method comprises:
    applying a coating in a thickness of at least about 0.5 mils of an epoxy-amine composition to a surface of said metal substrate; and
    subjecting the coated substrate to an elevated temperature sufficient to cure said composition to a cured coating, said epoxy-amine composition comprising:
    (A) epoxy resin component;
    (B) aromatic amine component;
    (C) optionally, acid component selected from polycarboxylic acid and anhydrides thereof; and
    (D) optionally, polyol component,
    wherein said component (B) and said component (A) are employed in relative amounts which provide about 0.5 to about 1.5 reactive amine hydrogens per each epoxide group in said composition, and components (A), (B), (C) and (D) are employed in relative amounts which, in said cured coating, result in less than about 20 percent of moieties bridging adjacent carbon atoms being ester moieties, based on the total of all moieties bridging adjacent carbom atoms in said cured coating which are not direct covalent bonds, said epoxy resin component (a) being selected from epoxy resins having (i) a number average molecular weight between about 200 and 10,000, and (ii) at least two 1,2 epoxide groups per molecule, and (b) comprising aromatic polyepoxide resin in sufficient portion that at least 50 percent of all carbon atoms present in said epoxy resin component are aromatic carbon atoms, and said aromatic amine component (a) being selected from aromatic amines having (i) a number average molecular weight between about 100 and about 10,000, (ii) at least one reactive amine group and at least two reactive amine hydrogens per molecule, and (iii) at least one phenyl ring per molecule, and (b) comprising at least about 90 weight percent aromatic polyamine having (i) at least two reactive amine groups per molecule and (ii) at least two phenyl rings per molecule wherein adjacent phenyl rings are bridged by moieties independently selected from a direct covalent bond, O, S, SO, $SO_2$, $PO_2$, CO, CONH, COO, and $CR_1R_2$, wherein $R_1$ and $R_2$ are independently hydrogen or alkyl of 1 to 4 carbon atoms, and wherein (i) at least 80 percent of said reactive amine groups present in said aromatic amine component are directly attached to said phenyl rings present in said aromatic amine component and (ii) at least 50 percent of all carbons atoms present in said aromatic amine component are aromatic carbon atoms.

2. The method according to claim 1, wherein said aromatic polyepoxide is a diepoxide resin.

3. The method according to claim 1, wherein said aromatic polyamine contains two phenyl rings per molecule.

4. The method according to claim 3, wherein said aromatic polyamine contains two amine groups per molecule.

5. The method according to claim 1, wherein said metal substrate is selected from uncoated steel, galvanized steel, tinplated steel, aluminized steel, aluminum, tin, zinc and copper.

6. The method according to claim 1, wherein said elevated temperature is about 150° C. to 200° C.

7. The method according to claim 1, wherein said component is a tailpipe.

8. The method according to claim 1, wherein said component is a muffler.

9. A motor vehicle exhaust system component comprising a metal substrate having a coating thereon formed by a method which comprises:
    applying a coating in a thickness of at least about 0.5 mils of an epoxy-amine composition to a surface of said metal substrate; and
    subjecting the coated substrate to an elevated temperature sufficient to cure said composition to a cured coating, said epoxy-amine composition comprising:
    (A) epoxy resin component;
    (B) aromatic amine component;
    (C) optionally, acid component selected from polycarboxylic acid and anhydrides thereof; and
    (D) optionally, polyol component,
    wherein said component (B) and said component (A) are employed in relative amounts which provide about 0.5 to about 1.5 reactive amine hydrogens per each epoxide group in said composition, and components (A), (B), (C) and (D) are employed in relative amounts which, in said cured coating, result in less than about 20 percent of moieties bridging adjacent carbon atoms being ester moieties, based on the total of all moieties bridging adjacent carbon atoms in said cured coating which are not direct covalent bonds, said epoxy resin component (a) being selected from epoxy resins having (i) a number average molecular weight between about 200 and 10,000, and (ii) having at least two 1,2 epoxide groups per molecule, and (b) comprising aromatic polyepoxide resin in sufficient portion that at least 50 percent of all carbon atoms present in said epoxy resin component are aromatic carbon atoms, and said aromatic amine component (a) being selected from aromatic amines having (i) a number average molecular weight between about 100 and about 10,000, (ii) at least one reactive amine group and at least two reactive amine hydrogens per molecule, and (iii) at least one phenyl ring per molecule, and (b) comprising at least about 90 weight percent aromatic polyamine having (i) at least two reactive amine groups per molecule and (ii) at least two phenyl rings per molecule wherein adjacent phenyl rings are bridged by moieties independently selected from a direct covalent bond O, S, SO, $SO_2$, $PO_2$, CO, CONH, COO, and $CR_1R_2$ wherein $R_1$ and $R_2$ are independently hydrogen or alkyl of 1 to 4 carbon atoms, and wherein (i) at least 80 percent of said reactive amine groups present in said aromatic amine component are directly attached to phenyl rings present therein and (ii) at least 50 percent of all carbons atoms in present said aromatic amine component are aromatic carbon atoms.

10. The motor vehicle exhaust system component according to claim 9, wherein said component is a tailpipe.

11. The motor vebicle exhaust system component according to claim 9, wherein said component is a muffler.

12. The motor vehicle exhaust system component according to claim 13, wherein said aromatic polyepoxide is a diepoxide resin.

13. The motor vehicle exhaust system component according to claim 13, wherein said aromatic polyamine contains two phenyl rings per molecule.

14. The motor vehicle exhaust system component according to claim 13, wherein said aromatic polyamine contains two amine groups per molecule.

15. The motor vehicle exhaust system component according to claim 9, wherein said metal substrate is selected from uncoated steel, galvanized steel, tinplated steel, aluminized steel, aluminum, tin, zinc and copper.

16. The motor vehicle exhaust system component according to claim 9, wherein said elevated temperature is about 150° C. to 200° C.

* * * * *

UNITED STATES PATENT AND TRADEMARK OFFICE
CERTIFICATE OF CORRECTION

PATENT NO. : 4,808,441

DATED : February 28, 1989

INVENTOR(S) : Mohinder S. Chattha and Harendra S. Gandhi

It is certified that error appears in the above-identified patent and that said Letters Patent is hereby corrected as shown below:

In Claim 12, at column 16, line 10, cancel "claim 13" and replace with --claim 9--.

In Claim 13, at column 16, line 13, cancel "claim 13" and replace with --claim 9--.

Signed and Sealed this

Ninth Day of January, 1990

Attest:

JEFFREY M. SAMUELS

*Attesting Officer*   Acting Commissioner of Patents and Trademarks